United States Patent
Neuneker et al.

(10) Patent No.: US 11,475,113 B2
(45) Date of Patent: Oct. 18, 2022

(54) VOICE MODULATION BASED VOICE AUTHENTICATION

(71) Applicant: HEWLETT-PACKARD DEVELOPMENT COMPANY, L.P., Houston, TX (US)

(72) Inventors: Jonathan Neuneker, Boise, ID (US); Paul Michael Carson, Boise, ID (US); Ian Christopher Shatto, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 1101 days.

(21) Appl. No.: 16/076,200

(22) PCT Filed: Jul. 11, 2017

(86) PCT No.: PCT/US2017/041572
§ 371 (c)(1),
(2) Date: Aug. 7, 2018

(87) PCT Pub. No.: WO2019/013770
PCT Pub. Date: Jan. 17, 2019

(65) Prior Publication Data
US 2021/0200843 A1    Jul. 1, 2021

(51) Int. Cl.
*G06F 21/00* (2013.01)
*G06F 21/32* (2013.01)
(Continued)

(52) U.S. Cl.
CPC .............. *G06F 21/32* (2013.01); *G10L 17/02* (2013.01); *G10L 17/06* (2013.01)

(58) Field of Classification Search
CPC combination set(s) only.
See application file for complete search history.

(56) References Cited

U.S. PATENT DOCUMENTS

| 6,922,668 B1 * | 7/2005 | Downey | ................. G10L 17/02 704/256 |
| 7,587,312 B2 | 9/2009 | Kim | |

(Continued)

FOREIGN PATENT DOCUMENTS

| CN | 101488929 A | 7/2009 |
| KR | 20070045766 A | 5/2007 |

(Continued)

OTHER PUBLICATIONS

"ICICI Bank launches voice recognition for customers", Cited on—http://www.business-standard.com/article/finance/icici-bank-launches-voice-recognition-for-customers-115052500503_1.html, May 26, 2015, 6 Pages.

*Primary Examiner* — Jeffrey C Pwu
*Assistant Examiner* — William A Corum, Jr.
(74) *Attorney, Agent, or Firm* — Mannava & Kang

(57) ABSTRACT

In some examples, voice modulation based voice authentication may include receiving a signal that represents a modulated voice of a user, and analyzing the signal to ascertain a specified code for a specified time period. Voice modulation based voice authentication may further include determining, for the specified time period, an authentication code from a plurality of authentication codes, and comparing the specified code to the authentication code. In response to a determination that the specified code matches the authentication code, voice modulation based voice authentication may further include authenticating the user.

15 Claims, 5 Drawing Sheets

(51) Int. Cl.
   *G10L 17/02* (2013.01)
   *G10L 17/06* (2013.01)

(56) References Cited

U.S. PATENT DOCUMENTS

| | | |
|---|---|---|
| 8,019,609 B2 | 9/2011 | Tamir et al. |
| 8,385,888 B2 | 2/2013 | Labrador et al. |
| 10,079,024 B1* | 9/2018 | Bhimanaik ............. G10L 17/02 |
| 2007/0185718 A1 | 8/2007 | Di et al. |
| 2013/0347129 A1 | 12/2013 | Samuelsson et al. |
| 2018/0113675 A1* | 4/2018 | Rutherford ............. G06F 3/167 |
| 2018/0146370 A1* | 5/2018 | Krishnaswamy ..... G10L 19/018 |
| 2018/0324293 A1* | 11/2018 | Davis ..................... H04M 3/51 |
| 2019/0013033 A1* | 1/2019 | Bhimanaik ........... G10L 19/018 |

FOREIGN PATENT DOCUMENTS

| | | |
|---|---|---|
| KR | 201500007694 A | 1/2015 |
| WO | 0177991 A2 | 10/2001 |
| WO | 2016151193 A1 | 9/2016 |

\* cited by examiner

400

```
┌─────────────────────────────────────────────────────────────┐
│   RECEIVE A SIGNAL THAT REPRESENTS A MODULATED VOICE OF A USER │
│                            402                               │
└─────────────────────────────────────────────────────────────┘
                              │
                              ▼
┌─────────────────────────────────────────────────────────────┐
│   ANALYZE THE SIGNAL TO ASCERTAIN A PRIMARY PATTERN          │
│   CORRESPONDING TO AN UNMODULATED VOICE OF THE USER          │
│                            404                               │
└─────────────────────────────────────────────────────────────┘
                              │
                              ▼
┌─────────────────────────────────────────────────────────────┐
│   COMPARE THE PRIMARY PATTERN TO AN AUTHENTICATION PATTERN   │
│                            406                               │
└─────────────────────────────────────────────────────────────┘
                              │
                              ▼
┌─────────────────────────────────────────────────────────────┐
│   IN RESPONSE TO A DETERMINATION THAT THE PRIMARY PATTERN    │
│   MATCHES THE AUTHENTICATION PATTERN, ANALYZE THE SIGNAL TO  │
│   ASCERTAIN A SPECIFIED CODE FOR A SPECIFIED TIME PERIOD     │
│                            408                               │
└─────────────────────────────────────────────────────────────┘
                              │
                              ▼
┌─────────────────────────────────────────────────────────────┐
│   DETERMINE, FOR THE SPECIFIED TIME PERIOD, AN AUTHENTICATION│
│   CODE FROM A PLURALITY OF AUTHENTICATION CODES              │
│                            410                               │
└─────────────────────────────────────────────────────────────┘
                              │
                              ▼
┌─────────────────────────────────────────────────────────────┐
│   COMPARE THE SPECIFIED CODE TO THE AUTHENTICATION CODE      │
│                            412                               │
└─────────────────────────────────────────────────────────────┘
                              │
                              ▼
┌─────────────────────────────────────────────────────────────┐
│   IN RESPONSE TO A DETERMINATION THAT THE SPECIFIED CODE     │
│   MATCHES THE AUTHENTICATION CODE, AUTHENTICATE THE USER     │
│                            414                               │
└─────────────────────────────────────────────────────────────┘
```

*FIG. 4*

VOICE MODULATION BASED VOICE AUTHENTICATION

BACKGROUND

A variety of techniques may be used to authenticate a user. For example, a user may be authenticated based on verification of a spoken code word that is assigned to the user. A user may also be authenticated based on other techniques that include computer password entry, retina scanning, fingerprint scanning, etc.

BRIEF DESCRIPTION OF DRAWINGS

Features of the present disclosure are illustrated by way of example and not limited in the following figure(s), in which like numerals indicate like elements, in which:

FIG. 4 illustrates an example flowchart of a method for voice modulation based voice authentication.

DETAILED DESCRIPTION

Figure 1:
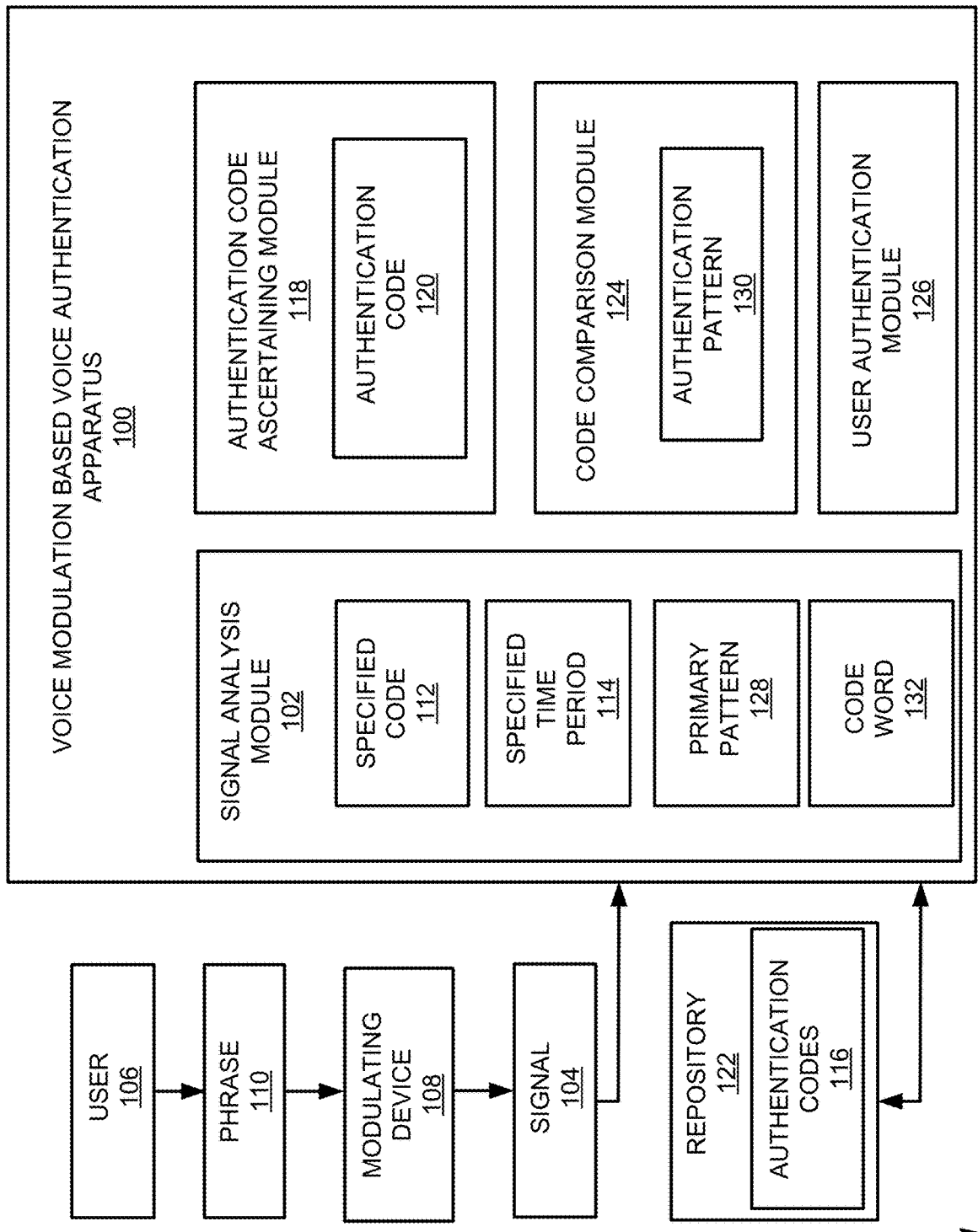
FIG. 1 illustrates an example layout of a voice modulation based voice authentication apparatus.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Voice modulation based voice authentication apparatuses, methods for voice modulation based voice authentication, and non-transitory computer readable media having stored thereon machine readable instructions to provide voice modulation based voice authentication are disclosed herein. The apparatuses, methods, and non-transitory computer readable media disclosed herein provide for modulation of a voice of a user to generate a modulated signal, and authentication of the user based on the modulated signal. For example, the modulated signal may be generated by modulating the user's voice at a specified frequency. For example, the modulated signal may be generated by extracting a waveform based on digits of a specified phrase. Thus, the modulated signal may be analyzed to ascertain a specified code for a specified time period. In this regard, the specified time period may correspond to a current time period, and the current time period may be valid for a specified time duration. Thus, a specified code generated outside of the current time period may be determined to be invalid for authentication purposes. A plurality of authentication codes may be stored for different time periods. An authentication code may be determined for the specified time period from the plurality of authentication codes. The specified code (for the specified time period) may be compared to the authentication code (for the specified time period). In response to a determination that the specified code matches the authentication code, the user may be authenticated.

With respect to authentication of a user, a user's voice may be modulated to generate and store authentication data. For example, a modulated version of a user's voice may be stored as authentication data. When an authentication is to be performed, the stored authentication data may be transmitted to a security device. The security device may compare the received authentication data to authentication data stored on the security device to determine whether a match exists. In this regard, it is technically challenging to determine whether the authentication is performed on a pre-recorded user's voice.

In order to address at least these technical challenges associated with authentication of a user, for the voice modulation based voice authentication as disclosed herein, when an authentication is to be performed, a determination is made, for a specified time period, of an authentication code from a plurality of authentication codes. Further, in response to a determination that the specified code matches the authentication code (for the specified time period), the user is authenticated. Thus, any techniques where a passphrase (e.g., the user's voice) is pre-recorded and then reused as the output may be invalidated, as the passphrase would need to be modulated properly to be effective.

For the apparatuses, methods, and non-transitory computer readable media disclosed herein, modules, as described herein, may be any combination of hardware and programming to implement the functionalities of the respective modules. In some examples described herein, the combinations of hardware and programming may be implemented in a number of different ways. For example, the programming for the modules may be processor executable instructions stored on a non-transitory machine-readable storage medium and the hardware for the modules may include a processing resource to execute those instructions. In these examples, a computing device implementing such modules may include the machine-readable storage medium storing the instructions and the processing resource to execute the instructions, or the machine-readable storage medium may be separately stored and accessible by the computing device and the processing resource. In some examples, some modules may be implemented in circuitry.

FIG. 1 illustrates an example layout of a voice modulation based voice authentication apparatus (hereinafter also referred to as "apparatus 100").

Figure 2:
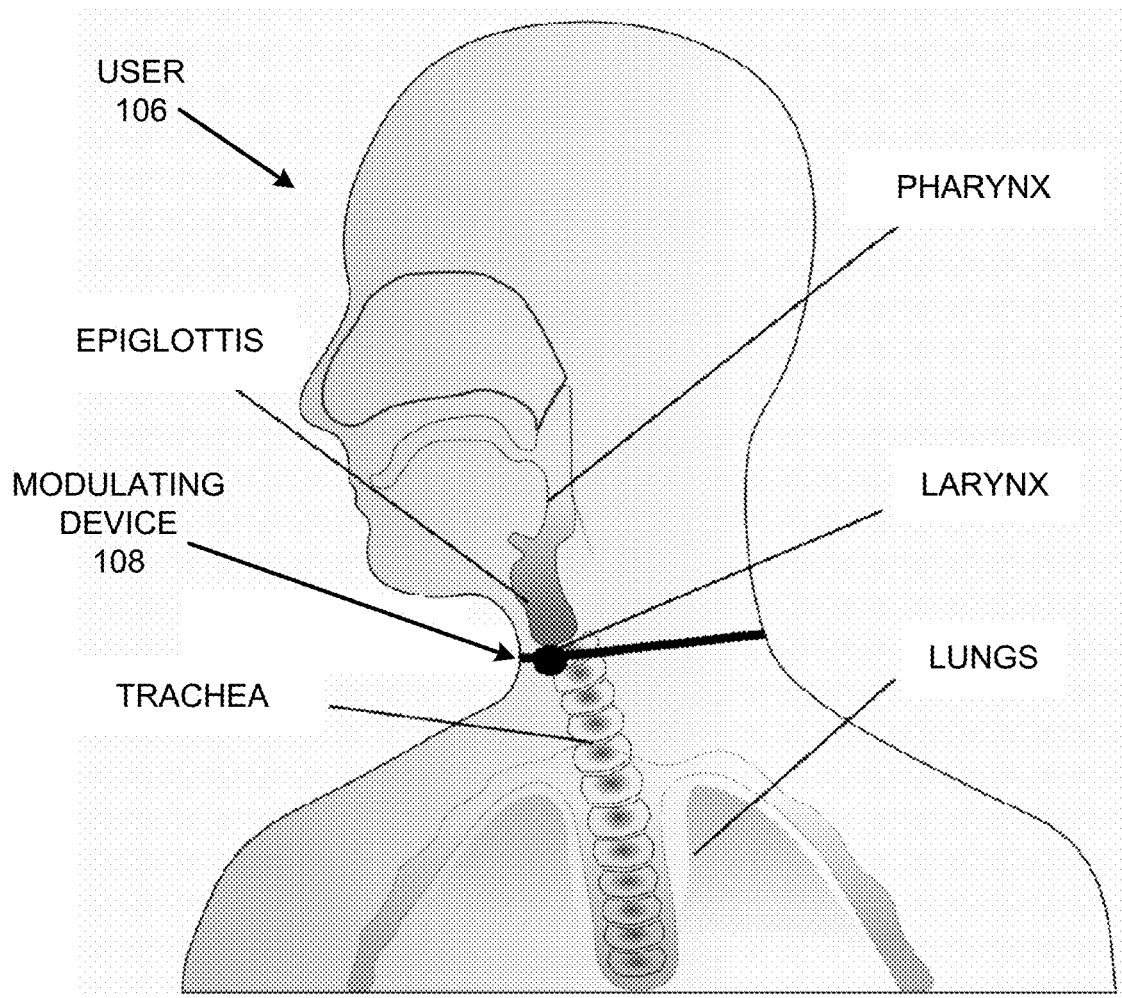
FIG. 2 illustrates an example layout of a voice modulation device attached to a user's larynx.

Referring to FIG. 1, the apparatus 100 may include a signal analysis module 102 to receive a signal 104 that represents a modulated voice of a user 106. The signal 104 may be generated by a modulating device 108 attached to a throat (e.g., larynx) of the user 106 as shown in FIG. 2. Alternatively or additionally, the signal may be generated by a device, such as a microphone (not shown) into which the user 106 speaks. In the latter case, the microphone (not shown) may be disposed at a distance from the user 106, and the user 106 may speak into the microphone.

Referring to FIGS. 1 and 2, the modulating device 108 may include any type of modulating device that adds, for example, a gap, or a plurality of gaps to a phrase 110 spoken by the user. For example, assuming that the phrase 110 spoken by the user 106 is "hello", the modulating device 108 may add gaps of 1 ms, 10 ms, 15 ms, and 50 ms at different predetermined points during the phrase "hello". The location and/or duration of the gaps may represent a specified code 112 as disclosed herein. The specified code 112 may represent a pattern that includes a plurality of gaps inserted in another signal of an unmodulated voice of the user 106. The another signal may represent a signal between the phrase 110 spoken by the user 106 and the modulating device 108.

According to another example, the modulating device 108 may add a number of digits that correspond to the specified code 112. For example, the specified code 112 may include eight digits such as "12573678". Thus, the specified code 112 may represent a pattern that includes a plurality of digits inserted in another signal of an unmodulated voice of the user 106. According to an example, the digits may be generated by an open authentication (OATH) token.

Other types of modulation techniques may be used in view of this disclosure. For example, a vibration pattern may be added to the phrase 110 spoken by the user 106.

The signal analysis module 102 is to analyze the signal 104 to ascertain the specified code 112 for a specified time period 114. For example, the signal analysis module 102 is to analyze the signal 104 to extract the specified code 112 for the specified time period 114. For example, the specified time period 114 may correspond to an n-second time period within a twenty-four hour time duration. For example, in a twenty-four hour time duration, the specified time period 114 may correspond to a 20-second time period. In this manner, a twenty-four hour time duration may include 4320 specified time periods (e.g., (24 hours×60 minutes/hour×60 seconds/minute)/(20-second time period). The specified time period 114 may also represent a time duration during which the specified code 112 is valid for authenticating the user 106. Thus, outside of the specified time period 114, the specified code 114 would be invalid for authenticating the user 106. Further, a number of the specified time periods may be increased and/or a time duration associated with the specified time periods may be reduced to increase a security level associated with authentication of the user 106.

According to another example, the signal analysis module 102 is to analyze the signal 104 to ascertain the specified code 112 for the specified time period 114 by first converting the signal 104 into an MP3 or another file format, and extracting a waveform from the converted signal 104. The waveform may be analyzed to confirm that the waveform matches at least to a degree of compatibility as expected by a repository of authentication codes as disclosed herein.

According to another example, the specified code 112 for the specified time period 114 may be different than other specified codes for other specified time periods. Alternatively, a set of specified codes may be cycled so that there are a plurality of specified codes for specified time periods (e.g., 100 specified codes that are cycled during a twenty-four hour time duration, as opposed to 4320 specified codes as discussed above). Further, the other specified codes for the other specified time periods may each include corresponding authentication codes from a plurality of authentication codes 116.

An authentication code ascertaining module 118 is to determine, for the specified time period 114, an authentication code 120 from a plurality of authentication codes 116. Thus, the authentication code ascertaining module 118 may be programmed to determine the authentication code 120 corresponding to the specified time period 114, which may be a current time period. In other words, prior to the specified time period 114, the authentication code ascertaining module 118 may be programmed to determine a next authentication code (i.e., the authentication code 120) from the plurality of authentication codes 116, where the next authentication code 120 corresponds to the specified time period 114. The programming of the authentication code ascertaining module 118 to determine the authentication code 120 corresponding to the specified time period 114 may be based on synchronization of the modulating device 108 and the authentication code ascertaining module 118 with respect to the specified code 112 and the authentication code 120. The authentication codes 116 may be stored in a repository 122 of the authentication codes 116.

A code comparison module 124 is to compare the specified code 112 to the authentication code 120. For example, the code comparison module 124 may perform a gap-by-gap or a digit-by-digit analysis to compare the specified code 112 to the authentication code 120.

In response to a determination that the specified code 112 matches the authentication code 120, a user authentication module 126 is to authenticate the user 106. For example, in response to a determination that each gap or each digit in the specified code 112 matches each corresponding gap or each corresponding digit of the authentication code 120, the user authentication module 126 is to authenticate the user 106.

According to an example, the signal analysis module 102 is to analyze the signal 104 to ascertain a primary pattern 128 corresponding to an unmodulated voice of the user 106. In this regard, the code comparison module 124 is to compare the primary pattern 128 to an authentication pattern 130. For example, if the primary pattern 128 represents any phrase whatsoever spoken by the user 106, the authentication pattern 130 may represent a pattern that authenticates the voice of the user 106 compared to voices of other users. Further, in response to a determination that the primary pattern 128 matches the authentication pattern 130, as disclosed herein, the code comparison module 124 is to compare the specified code 112 to the authentication code 120 to authenticate the user 106. In this case, the specified code 112 may represent a secondary pattern that provides a second type of authentication of the user 106. Thus, if the primary pattern 128 does not match the authentication pattern 130, no further analysis is needed or performed as the user 106 is determined to be a different user compared to the user associated with the authentication pattern 130.

According to an example, the signal analysis module 102 is to analyze the signal 104 to ascertain the primary pattern 128 corresponding to an unmodulated voice of the user 106 speaking a code word 132. For example, the code word 132 may represent a password such as "apple", etc. In this regard, the code comparison module 124 is to compare the code word 132 of the primary pattern 128 to a code word of the authentication pattern 130. Further, in response to a determination that code word 132 of the primary pattern 128 matches the code word of authentication pattern 130, the code comparison module 124 is to compare the specified code 112 to the authentication code 120 to authenticate the user 106. Thus, if the code word 132 of the primary pattern 128 does not match the code word of authentication pattern 130, no further analysis is needed or performed as the user 106 is determined not know the code word 132 for authentication purposes.

According to an example, authentication of the user 106 may be performed with or without the code word 132 as disclosed herein. For example, when the authentication of the user 106 is performed without the code word 132, the user 106 that is aware of the use of false code words may nevertheless speak different false code words to add complexities to an attempted breach of the authentication process by an unauthorized entity. For example, for one authentication attempt, the user 106 may speak a false code word "apple", and for another authentication attempt, the user 106 may speak a false code word "cake", etc. In this regard, authentication of the user 106 may be performed based on the primary pattern 128 as disclosed herein, and further based on the specified code 112 as disclosed herein. An unauthorized entity trying to ascertain the user's code word may be unaware that the code words "apple", "cake", etc., represent false code words, and may attempt to bypass the authentication process by attempting to ascertain a correct code word. Thus, use of false code words in this manner may add complexities to an attempted breach of the authentication process by an unauthorized entity.

According to an example, for the specified code 112 that represents a pattern that includes a plurality of gaps inserted in another signal of an unmodulated voice of the user, the code comparison module 124 is to determine whether the user 106 stops speaking before an inserted gap of the plurality of gaps. In response to a determination that the user 106 stops speaking before the inserted gap of the plurality of gaps, the code comparison module 124 is to compare a portion of the specified code before the inserted gap to a corresponding portion of the authentication code 120. That is, assuming that the specified code 112 includes a pattern that includes a plurality of gaps inserted at times $t_1, t_2, t_3$, and $t_4$, in response to a determination that the user 106 stops speaking before the inserted gap at $t_4$, the code comparison module 124 is to compare a portion of the specified code before the inserted gap (e.g., the inserted gap at $t_4$) to a corresponding portion of the authentication code 120. Further, in response to a determination that the portion of the specified code 112 before the inserted gap matches the corresponding portion of the authentication code 120, the user authentication module 126 is to authenticate the user 106.

According to an example, for the specified code 112 that represents a pattern that includes a plurality of gaps inserted in another signal of an unmodulated voice of the user, the code comparison module 124 is to determine whether the user 106 stops speaking before an inserted gap of the plurality of gaps. In response to a determination that the user 106 stops speaking before the inserted gap of the plurality of gaps, the code comparison module 124 is to determine whether there are a sufficient number of inserted gaps before the inserted gap during which the user stops speaking. That is, assuming that the specified code 112 includes a pattern that includes a plurality of gaps inserted at times $t_1, t_2, t_3$, and $t_4$, in response to a determination that the user 106 stops speaking before the inserted gap at $t_4$, the code comparison module 124 is to determine whether there are a sufficient number of inserted gaps before the inserted gap during which the user 106 stops speaking. For example, the sufficient number of inserted gaps may include a minimum of three inserted gaps. In response to a determination that there are the sufficient number of inserted gaps before the inserted gap during which the user stops speaking, the code comparison module 124 is to compare a portion of the specified code 112 before the inserted gap to a corresponding portion of the authentication code 120. Further, in response to a determination that the portion of the specified code 112 before the inserted gap matches the corresponding portion of the authentication code 120, the user authentication module 126 is to authenticate the user 106.

Figure 3:
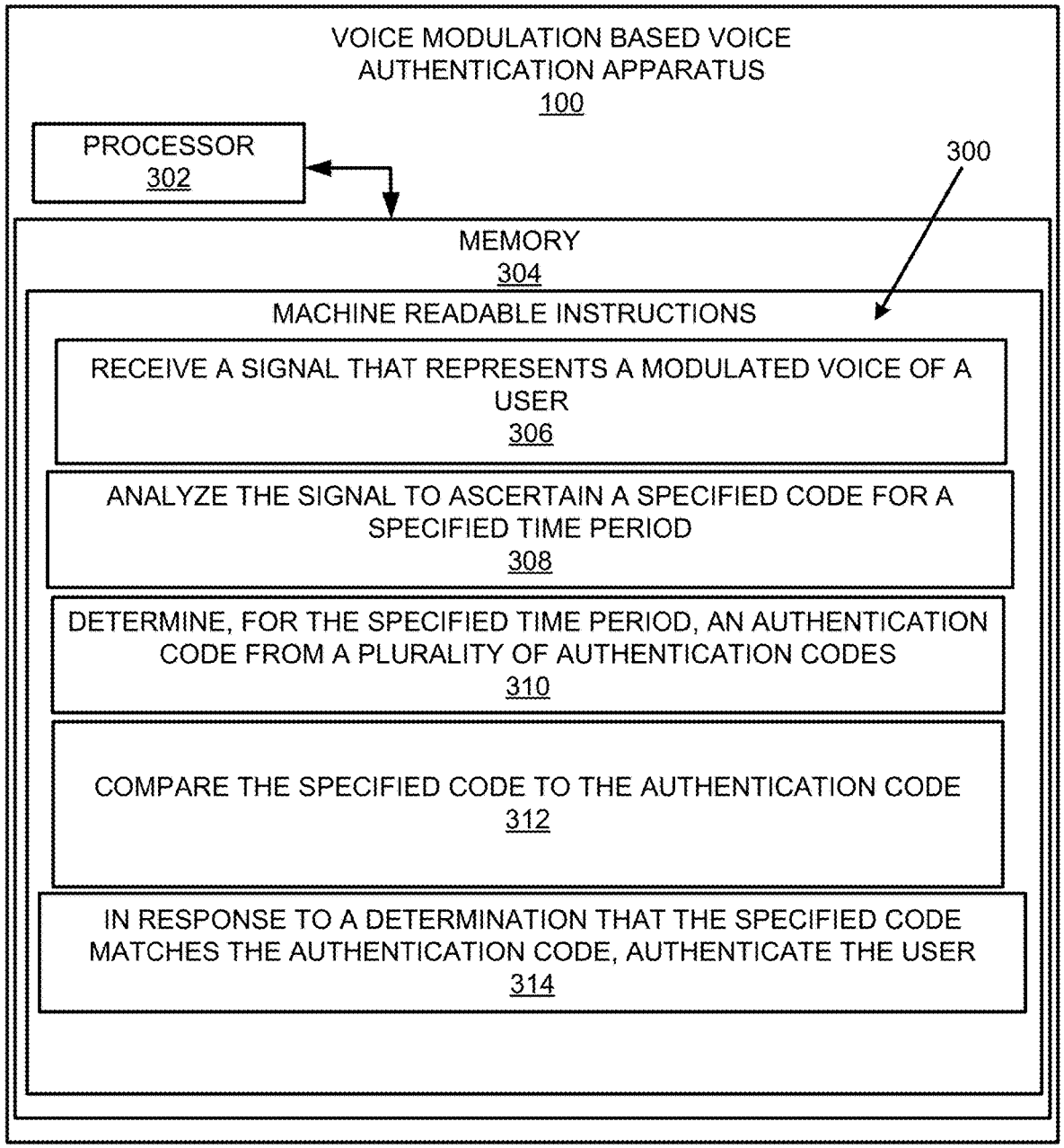
FIG. 3 illustrates an example block diagram for voice modulation based voice authentication.
Figure 5:
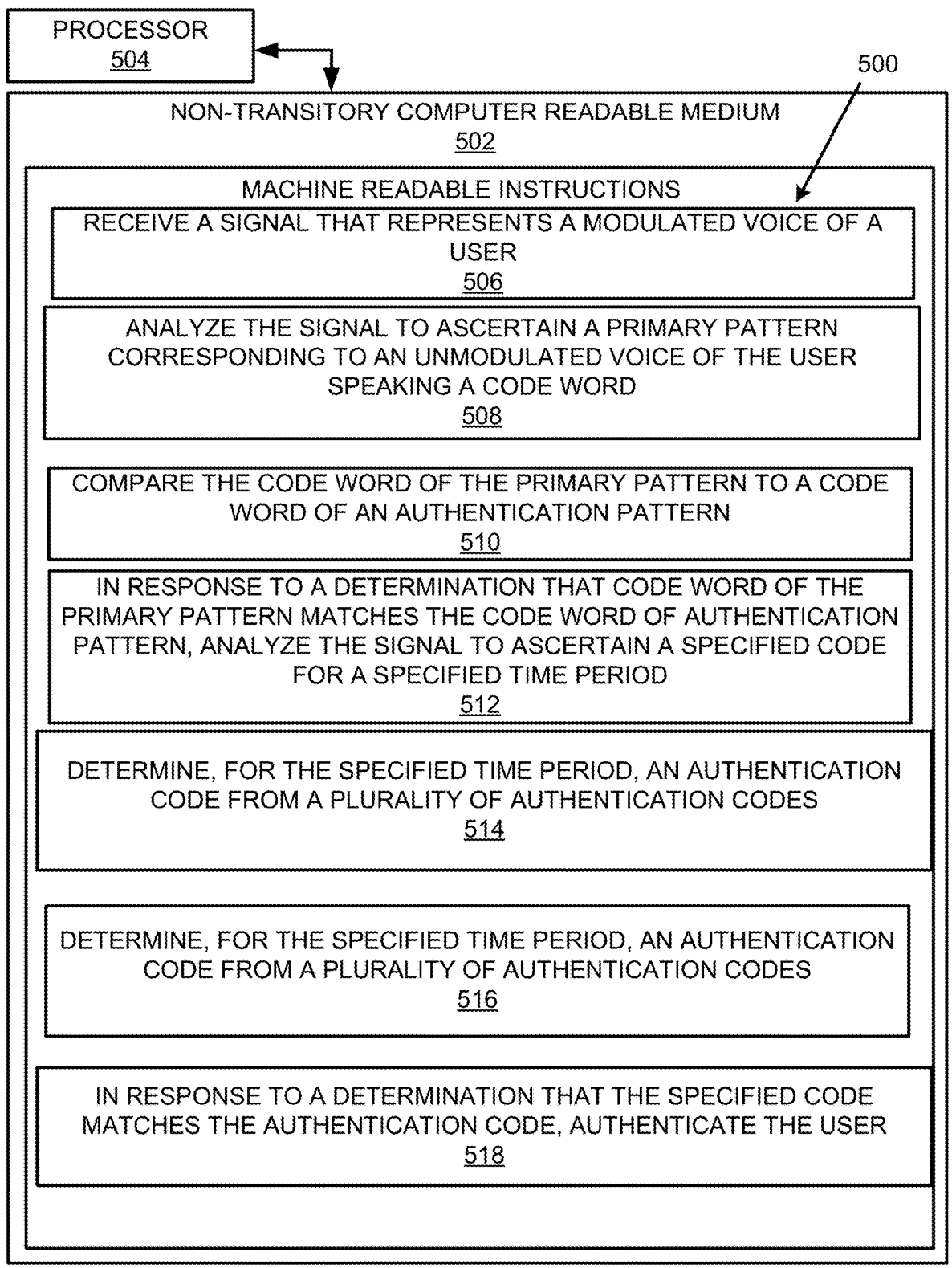
FIG. 5 illustrates a further example block diagram for voice modulation based voice authentication.

FIGS. 3-5 respectively illustrate an example block diagram 300, an example flowchart of a method 400, and a further example block diagram 500 for voice modulation based voice authentication. The block diagram 300, method 400, and the block diagram 500 may be implemented on the apparatus 100 described above with reference to FIG. 1 by way of example and not limitation. The block diagram 300, the method 400, and the block diagram 500 may be practiced in other apparatus. In addition to showing the block diagram 300, FIG. 3 shows hardware of the apparatus 100 that may execute the instructions of the block diagram 300. The hardware may include a processor 302, and a memory 304 (i.e., a non-transitory computer readable medium) storing machine readable instructions that when executed by the processor cause the processor to perform the instructions of the block diagram 300. The memory 304 may represent a non-transitory computer readable medium. FIG. 4 may represent a method for voice modulation based voice authentication, and the steps of the method. FIG. 5 may represent a non-transitory computer readable medium 502 having stored thereon machine readable instructions to provide voice modulation based voice authentication. The machine readable instructions, when executed, cause a processor 504 to perform the instructions of the block diagram 500 also shown in FIG. 5.

The processor 302 of FIG. 3 and/or the processor 504 of FIG. 5 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 502 of FIG. 5), such as hardware storage devices (e.g., RAM (random access memory), ROM (read only memory), EPROM (erasable, programmable ROM), EEPROM (electrically erasable, programmable ROM), hard drives, and flash memory). The memory 304 may include a RAM, where the machine readable instructions and data for a processor may reside during runtime.

Referring to FIGS. 1-3, and particularly to the block diagram 300 shown in FIG. 3, the memory 304 may include instructions 306 to receive a signal 104 that represents a modulated voice of a user 106.

The processor 302 may fetch, decode, and execute the instructions 308 to analyze the signal 104 to ascertain the specified code 112 for a specified time period 114.

The processor 302 may fetch, decode, and execute the instructions 310 to determine, for the specified time period 114, an authentication code 120 from a plurality of authentication codes 116.

The processor 302 may fetch, decode, and execute the instructions 312 to compare the specified code 112 to the authentication code 120.

The processor 302 may fetch, decode, and execute the instructions 314 to, in response to a determination that the specified code 112 matches the authentication code 120, authenticate the user 106.

Referring to FIGS. 1, 2, and 4, and particularly FIG. 4, for the method 400, at block 402, the method may include receiving, by a processor, a signal 104 that represents a modulated voice of a user 106.

At block 404 the method may include analyzing the signal 104 to ascertain a primary pattern 128 corresponding to an unmodulated voice of the user 106.

At block 406 the method may include comparing the primary pattern 128 to an authentication pattern 130.

At block 408 the method may include, in response to a determination that the primary pattern 128 matches the authentication pattern 130, analyzing the signal 104 to ascertain a specified code 112 for a specified time period 114. The specified code 112 may represent a secondary pattern.

At block 410 the method may include determining, for the specified time period 114, an authentication code from a plurality of authentication codes 116.

At block 412 the method may include comparing the specified code 112 to the authentication code.

At block 414 the method may include, in response to a determination that the specified code 112 matches the authentication code, authenticating the user 106.

Referring to FIGS. 1, 2, and 5, and particularly FIG. 5, for the block diagram 500, the non-transitory computer readable medium 502 may include instructions 506 to receive a signal 104 that represents a modulated voice of a user 106.

The processor 504 may fetch, decode, and execute the instructions 508 to analyze the signal 104 to analyze the signal to ascertain a primary pattern 128 corresponding to an unmodulated voice of the user 106 speaking a code word.

The processor 504 may fetch, decode, and execute the instructions 510 to compare the code word of the primary pattern 128 to a code word of an authentication pattern 130.

The processor 504 may fetch, decode, and execute the instructions 512 to, in response to a determination that code word of the primary pattern 128 matches the code word of authentication pattern 130, analyze the signal 104 to ascertain a specified code 112 for a specified time period 114. The specified code may represent a secondary pattern.

The processor 504 may fetch, decode, and execute the instructions 514 to determine, for the specified time period 114, an authentication code from a plurality of authentication codes 116.

The processor 504 may fetch, decode, and execute the instructions 516 to compare the specified code 112 to the authentication code.

The processor 504 may fetch, decode, and execute the instructions 518 to, in response to a determination that the specified code 112 matches the authentication code, authenticate the user 106.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An apparatus comprising:
a processor, and
a non-transitory computer readable medium storing machine readable instructions that when executed by the processor cause the processor to:
receive a modulated signal from a modulation device that modulates an unmodulated voice of a user with a specified code having a specific frequency, wherein the specified code is valid for authenticating the user only for a specified time period;
analyze the modulated signal to ascertain the specified code for the specified time period, by converting the modulated signal into a converted signal having a file format and extracting a waveform representing the specified code from the converted signal;
determine an authentication code corresponding to the specified time period from a plurality of authentication codes;
compare the specified code to the authentication code; and
in response to a determination that the specified code matches the authentication code, authenticate the user.

2. The apparatus according to claim 1, wherein the specified code represents a pattern that includes a plurality of gaps, and wherein the modulation device generates the modulated signal by inserting the plurality of gaps in various locations of the unmodulated voice of the user according to the pattern.

3. The apparatus according to claim 1, wherein the specified code represents a pattern that includes a plurality of digits, and wherein the modulation device generates the modulated signal by inserting the plurality of digits in various locations of the unmodulated voice of the user according to the pattern.

4. The apparatus according to claim 1, wherein outside of the specified time period, the specified code is invalid for authenticating the user.

5. The apparatus according to claim 1, the machine readable instructions cause the processor to:
analyze the modulated signal to ascertain a primary pattern corresponding to the unmodulated voice of the user;
compare the primary pattern to an authentication pattern representing a stored voice of the user; and
in response to a determination that the primary pattern matches the authentication pattern, compare the specified code to the authentication code to authenticate the user.

6. The apparatus according to claim 1, wherein the specified code represents a pattern that includes a plurality of gaps inserted in the unmodulated voice of the user, and wherein the machine readable instructions cause the processor to:
determine whether the user stops speaking before an inserted gap of the plurality of gaps;
in response to a determination that the user stops speaking before the inserted gap of the plurality of gaps, compare a portion of the specified code before the inserted gap to a corresponding portion of the authentication code; and
in response to a determination that the portion of the specified code before the inserted gap matches the corresponding portion of the authentication code, authenticate the user.

7. The apparatus according to claim 1, wherein the specified code represents a pattern that includes a plurality of gaps inserted in the unmodulated voice of the user, and wherein the machine readable instructions cause the processor to:
determine whether the user stops speaking before an inserted gap of the plurality of gaps;
in response to a determination that the user stops speaking before the inserted gap of the plurality of gaps, determine whether there are a sufficient number of inserted gaps before the inserted gap during which the user stops speaking;
in response to a determination that there are the sufficient number of inserted gaps before the inserted gap during which the user stops speaking, compare a portion of the specified code before the inserted gap to a corresponding portion of the authentication code; and
in response to a determination that the portion of the specified code before the inserted gap matches the corresponding portion of the authentication code, authenticate the user.

8. The apparatus according to claim 1, the machine readable instructions cause the processor to:
  analyze the modulated signal to ascertain a primary pattern corresponding to the unmodulated voice of the user speaking a code word;
  compare the code word of the primary pattern to a code word of an authentication pattern; and
  in response to a determination that the code word of the primary pattern matches the code word of the authentication pattern, compare the specified code to the authentication code to authenticate the user.

9. The apparatus according to claim 1, wherein the specified code for the specified time period is different than other specified codes for other specified time periods, and the other specified codes for the other specified time periods each include corresponding authentication codes from the plurality of authentication codes.

10. A method comprising:
  receiving, by a processor, a modulated signal from a modulation device that modulates an unmodulated voice of a user with a specified code having a specific frequency, wherein the specified code is valid for authenticating the user only for a specified time period;
  analyzing, by the processor, the modulated signal to ascertain a primary pattern corresponding to the unmodulated voice of the user;
  comparing, by the processor, the primary pattern to an authentication pattern representing a stored user voice;
  in response to a determination that the primary pattern matches the authentication pattern, analyzing the modulated signal to ascertain the specified code for the specified time period, wherein the specified code represents a secondary pattern;
  determining, by the processor, an authentication code corresponding to the specified time period from a plurality of authentication codes;
  comparing the specified code to the authentication code; and
  in response to a determination that the specified code matches the authentication code, authenticating the user.

11. The method according to claim 10, wherein analyzing the modulated signal to ascertain the specified code includes: converting the modulated signal into a converted signal having a file format, and extracting a waveform representing the specified code from the converted signal.

12. The method according to claim 10, wherein the specified code for the specified time period is different than other specified codes for other specified time periods, and the other specified codes for the other specified time periods each include corresponding authentication codes from the plurality of authentication codes.

13. A non-transitory computer readable medium storing machine readable instructions, the machine readable instructions, when executed, cause a processor to:
  receive a modulated signal from a modulation device that modulates an unmodulated voice of a user with a specified code having a specific frequency, wherein the specified code is valid for authenticating the user only for a specified time period;
  analyze the modulated signal to ascertain a primary pattern corresponding to the unmodulated voice of the user speaking a code word;
  compare the code word of the primary pattern to a code word of an authentication pattern;
  in response to a determination that the code word of the primary pattern matches the code word of the authentication pattern, analyze the modulated signal to ascertain the specified code for the specified time period, wherein the specified code represents a secondary pattern;
  determine an authentication code corresponding to the specified time period from a plurality of authentication codes;
  compare the specified code to the authentication code; and
  in response to a determination that the specified code matches the authentication code, authenticate the user.

14. The non-transitory computer readable medium according to claim 13, wherein the specified code represents the secondary pattern that includes a plurality of gaps, and wherein the modulation device generates the modulated signal by inserting the plurality of gas in various locations of the unmodulated voice of the user speaking the code word according to the secondary pattern.

15. The non-transitory computer readable medium according to claim 13, wherein the specified code represents the secondary pattern that includes a plurality of digits, and wherein the modulation device generates the modulated signal by inserting the plurality of digits in various locations of the unmodulated voice of the user speaking the code word according to the secondary pattern.

* * * * *